United States Patent
Miyake et al.

(10) Patent No.: US 10,883,434 B2
(45) Date of Patent: Jan. 5, 2021

(54) CONTROL DEVICE FOR FUEL INJECTION DEVICE

(71) Applicant: Hitachi Automotive Systems, Ltd., Hitachinaka (JP)

(72) Inventors: Takao Miyake, Hitachinaka (JP); Akiyasu Miyamoto, Hitachinaka (JP); Takatoshi Iizuka, Hitachinaka (JP); Kiyotaka Ogura, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 22 days.

(21) Appl. No.: 16/327,268

(22) PCT Filed: Jul. 7, 2017

(86) PCT No.: PCT/JP2017/024914
§ 371 (c)(1),
(2) Date: Feb. 21, 2019

(87) PCT Pub. No.: WO2018/037734
PCT Pub. Date: Mar. 1, 2018

(65) Prior Publication Data
US 2019/0211767 A1    Jul. 11, 2019

(30) Foreign Application Priority Data
Aug. 26, 2016    (JP) .................................. 2016-165280

(51) Int. Cl.
*F16K 31/06* (2006.01)
*F02D 41/20* (2006.01)
(Continued)

(52) U.S. Cl.
CPC ............ *F02D 41/20* (2013.01); *F02M 51/00* (2013.01); *F02M 51/06* (2013.01); *F02M 61/10* (2013.01);
(Continued)

(58) Field of Classification Search
CPC ............. F16K 31/0655; F16K 31/0658; F16K 31/0675; F02D 41/20; F02D 51/00; F02D 51/06; F02D 61/10
(Continued)

(56) References Cited

U.S. PATENT DOCUMENTS

| 7,774,126 B2* | 8/2010 | Abe ........................ F02D 41/20 |
| | | 123/490 |
| 7,789,073 B2* | 9/2010 | Miyake .................... F02D 41/20 |
| | | 123/482 |

(Continued)

FOREIGN PATENT DOCUMENTS

| JP | 2013-167194 A | 8/2013 |
| JP | 2013167194 A * | 8/2013 |

(Continued)

OTHER PUBLICATIONS

PCT International Search Report (with English Language Translation) and Written Opinion (Japanese Language only) in corresponding PCT/JP2017/024914 dated Oct. 24, 2017.

*Primary Examiner* — Matthew W Jellett
(74) *Attorney, Agent, or Firm* — Foley & Lardner LLP

(57) ABSTRACT

An object is to suppress an inclination of a waveform indicating an injection quantity with respect to an injection pulse particularly when a lift amount of a valve body is small and an injection pulse width is short, thereby improving control accuracy of the injection quantity of a fuel injection device. Thus, a control device for controlling a fuel injection device, which includes a valve body, a solenoid, and a movable element to open the valve body, is provided with a control unit that controls a drive voltage or a drive current to be applied to the solenoid, in which the control unit controls the drive current such that the drive current to be supplied to the solenoid decreases from a maximum drive (Continued)

current after the maximum drive current is supplied to the solenoid and before the valve body starts to open.

7 Claims, 12 Drawing Sheets

(51) Int. Cl.
  *F02M 51/06* (2006.01)
  *F02M 61/10* (2006.01)
  *F02M 51/00* (2006.01)
(52) U.S. Cl.
  CPC ...... *F16K 31/0655* (2013.01); *F16K 31/0675* (2013.01); *F16K 31/0658* (2013.01)
(58) Field of Classification Search
  USPC .................................................. 251/129.15
  See application file for complete search history.

(56) References Cited

U.S. PATENT DOCUMENTS

| 10,288,022 | B2* | 5/2019 | Yasukawa | .......... F02M 51/0671 |
| 2015/0267665 | A1 | 9/2015 | Abe et al. | |
| 2015/0354515 | A1* | 12/2015 | Yasukawa | .............. F02M 61/04 |
| | | | | 239/585.1 |
| 2016/0061139 | A1 | 3/2016 | Imai et al. | |
| 2016/0177855 | A1 | 6/2016 | Kusakabe et al. | |

FOREIGN PATENT DOCUMENTS

| JP | 2014-025419 A | 2/2014 | |
| JP | 2014-141924 A1 | 8/2014 | |
| JP | 2014-218977 A | 11/2014 | |
| JP | 2015-200197 A | 11/2015 | |
| WO | WO-2014141757 A1 * | 9/2014 | ......... F02M 51/0614 |
| WO | WO-2015-015541 A1 | 2/2015 | |

* cited by examiner

FIG. 3
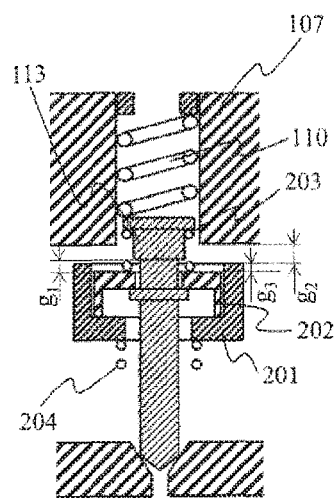
(a) VALVE-CLOSED STATE
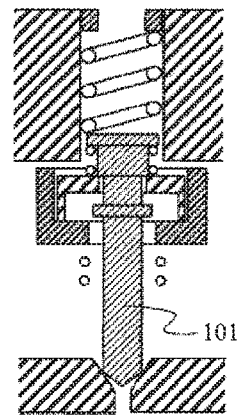
(b) VALVE-OPEN STATE
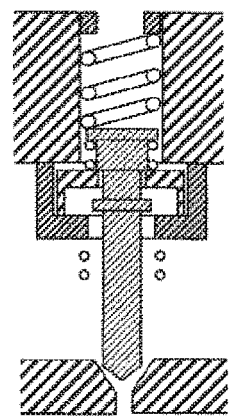
(c) SHORT STROKE STATE
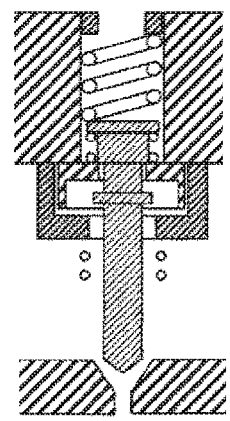
(d) LONG STROKE STATE FIG. 4
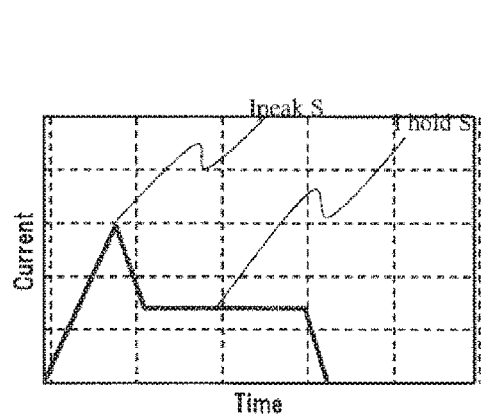
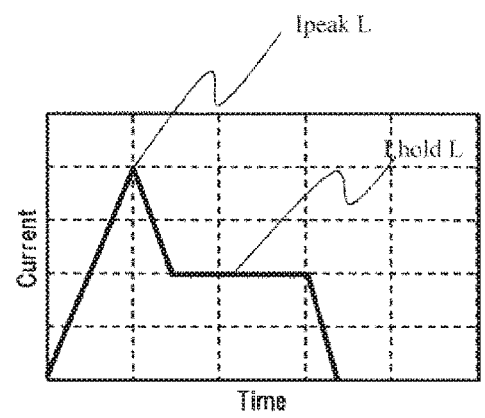
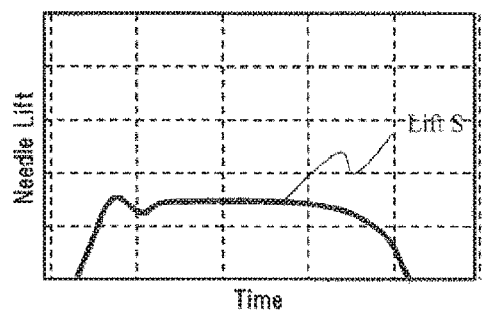
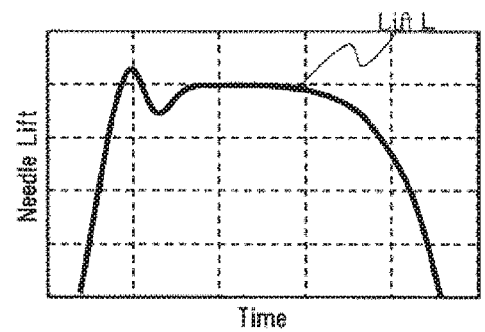
(a) CURRENT VALUE AND
VALVE BODY DISPLACEMENT
DURING SMALL STROKE
(b) CURRENT VALUE AND
VALVE BODY DISPLACEMENT
DURING LARGE STROKE

CONTROL DEVICE FOR FUEL INJECTION DEVICE

CROSS-REFERENCE TO RELATED APPLICATIONS

This application is a National Phase of International Patent Application No. PCT/JP2017/024914 filed on Jul. 7, 2017, which claims priority to Japanese Patent Application No. 2016-165280 filed on Aug. 26, 2016. The contents of these applications are herein incorporated by reference in their entirety.

TECHNICAL FIELD

The present invention relates to a control device for a fuel injection device used in an internal combustion engine.

BACKGROUND ART

A downsized engine, configured to acquire size reduction by reducing displacement and obtain output using a supercharger, has drawn attentions in recent years. In the downsized engine, it is possible to reduce a pumping loss or friction by reducing the displacement, and thus, it is possible to improve the fuel economy. Meanwhile, it is possible to obtain the sufficient output using the supercharger and to improve the fuel economy by suppressing a decrease in compression ratio accompanying the supercharging through an intake air cooling effect by performing in-cylinder direct injection. In particular, a fuel injection device using this downsized engine needs to be capable of injecting fuel over a wide range from the minimum injection quantity corresponding to the minimum output that can be obtained by the low displacement to the maximum injection quantity corresponding to the maximum output that is obtained by the supercharging, and there is a demand for expansion of a control range of the injection quantity. In addition, there is a demand for a fuel injection device which is capable of suppressing the total quantity of particulate matters (PM) during mode traveling and the particulate number (PN) as the number thereof along with reinforcement of the emission control.

One of background arts of a drive device for a fuel injection device in the technical field is PTL 1. This publication discloses that "a fuel injection control device (ECU) has the following selection means and pump control means. The selection means selects how to inject fuel by either full lift injection of starting a valve closing operation after a valve body reaches the full lift position or partial injection of starting the valve closing operation without requiring the valve body to reach the full lift position. The pump control means controls an operation of a high-pressure pump such that a pressure of fuel supplied to an injector becomes a target pressure. In a case where a maximum injection quantity when the partial injection is performed with a maximum value Pmax of the target pressure that a fuel injection system can take is referred to as a partial maximum injection quantity Qplmax, the selection means selects the partial injection if a required injection quantity Qreq is equal to or less than the partial maximum injection quantity Qplmax." As a drive current of the fuel injection device, "Vboost is cut off when a current value reaches a set Ip" is disclosed (see the abstract).

In addition, one of background arts of the fuel injection device in the technical field is PTL 2. This publication discloses that "it is configured to include a first movable element that is biased by a first spring biasing the first movable element in a valve closing direction as a movable element that is attracted by a magnetic core of a fuel injection device to perform opening/closing of a valve, and a second movable element biased in a direction of the magnetic core by a second spring biasing the second movable element in a valve opening direction." (see the abstract).

In addition, one of background arts of the fuel injection device in the technical field is PTL 3. This publication discloses that "A peak current Ipeak or a step-up voltage application timing Tp, and a voltage cutoff period T2 may be adjusted to reach timing when a fixed voltage is supplied from a battery voltage source is before the time when a valve body starts to open." (see the abstract).

CITATION LIST

Patent Literature

PTL 1: JP 2014-218977 A
PTL 2: JP 2014-25419 A
PTL 3: WO 2015/015541A1

SUMMARY OF INVENTION

Technical Problem

In general, the injection quantity of the fuel injection device is controlled by the pulse width of the injection pulse output from the ECU. The injection quantity increases as the injection pulse width increases, and the fuel injection quantity decreases as the injection pulse width decreases, and the relationship thereof is substantially linear. However, the force in the valve opening direction becomes too strong since the maximum drive current Ipeak continues to flow even after the valve opening is started in the drive waveform of the fuel injection device in the related art. Thus, there is a risk that an increase of a displacement amount of the valve body with respect to a pulse width becomes too large so that it becomes difficult to control the injection quantity particularly in a low injection quantity region. In addition, the valve body exhibits a bound behavior in a region where the injection pulse width is short when the movable element collides with a fixed iron core or the like, and a time until the valve body reaches a valve closing position from stop of the injection pulse fluctuates. Thus, there is a problem that the injection quantity does not linearly change with respect to the injection pulse width so that the controllable minimum injection quantity of the fuel injection device increases.

This problem is particularly conspicuous in a fuel injection valve and a control device thereof in which a lift amount of the valve body is made smaller than a conventional amount in order to reduce the minimum injection quantity.

Here, when driving is performed with the drive current of the fuel injection device disclosed in PTL 1, there is a risk that an inclination of the waveform indicating the injection quantity with respect to the injection pulse may increase. For example, in the case of using the fuel injection device having a preliminary stroke mechanism described in PTL 2, a valve opening force of the valve body generated by the movable element is larger than that of the fuel injection device having no preliminary stroke mechanism due to a preliminary operation of the movable element. Thus, when the inclination of the waveform indicating the injection quantity with respect to the injection pulse increases, there is a risk that control accuracy of the fuel injection quantity of the fuel injection device may decrease as a result due to a restriction in control resolution of the fuel injection device.

Therefore, an object of the present invention is to suppress an inclination of a waveform indicating an injection quantity with respect to an injection pulse particularly when an injection pulse width is short, thereby improving control accuracy of the injection quantity of a fuel injection device. Another object is to apply the present invention to a fuel injection valve and a control device thereof in which a lift amount of a valve body is made smaller than the conventional one in order to reduce a minimum injection quantity.

Solution to Problem

In order to solve the above problems, the present invention is characterized by "a control device for controlling a fuel injection device having a valve body, a solenoid, and a movable element to open the valve body, the control device comprising: a control unit that controls a drive voltage or a drive current to be applied to the solenoid, in which the control unit decreases the drive current to be supplied to the solenoid from a maximum drive current after the maximum drive current is supplied to the solenoid and before the valve body starts to open, and controls the drive current so as to shift to a holding current smaller than the maximum drive current before the valve body is fully open".

Advantageous Effects of Invention

According to the present invention, it is possible to suppress the inclination of the waveform indicating the injection quantity with respect to the injection pulse particularly when the injection pulse width is short, thereby improving the control accuracy of the injection quantity of the fuel injection device.

BRIEF DESCRIPTION OF DRAWINGS

FIG. 3 is a diagram illustrating an enlarged view of a drive unit structure in a state where a movable element of the fuel injection device according to the embodiment of the present invention collides with a valve body.

FIG. 4 is a graph illustrating a relationship among a drive current applied to a solenoid 108 of the fuel injection device when driving the fuel injection device according to the embodiment of the present invention, displacements of a valve body 101 and the movable element, and time.

DESCRIPTION OF EMBODIMENTS

An embodiment of the present invention will be described with reference to FIGS. 1 to 13.

Embodiment

In general, the injection quantity of the fuel injection device is controlled by the pulse width of the injection pulse output from the ECU. The injection quantity increases as the injection pulse width increases, and the fuel injection quantity decreases as the injection pulse width decreases, and the relationship thereof is substantially linear. However, in a drive waveform of the fuel injection device, a force in a valve opening direction becomes too strong if a maximum drive current Ipeak continues to flow even after valve opening is started, and thus, there is a case where the injection quantity is not stable for each individual of the fuel injection devices due to a rebound phenomenon of a movable element. In addition, it is necessary to set individuals with the largest injection quantity as a controllable minimum injection quantity, which may be a factor of increasing the minimum injection quantity.

Further, if the injection pulse width is further shortened from an injection pulse in a nonlinear region in which a relationship between the injection pulse and the injection quantity does not become linear, an intermediate lift region where the movable element does not collide with a fixed iron core, that is, a valve body is not fully lifted is formed. Even if the same injection pulse is supplied to each fuel injection devices of cylinders, a lift amount, a start timing of valve opening, and an end timing of valve closing of the fuel injection devices differ depending on an individual difference caused by influence of dimensional tolerance of the fuel injection device. Thus, individual variations among the injection quantities become large, and it is difficult to use this intermediate lift region from the viewpoint of stability of combustion.

In order to improve fuel economy, it is necessary to reduce the variations in the injection quantities of the fuel injection devices and reduce the controllable minimum injection quantity, and it is required to control the injection quantity in a region where the injection pulse is short or in the intermediate lift region where the injection pulse is small and the valve body does not reach a target lift in order to greatly reduce the minimum injection quantity. Alternatively, it is required to install a mechanism capable of selecting a different lift amount for each one fuel injection valve, and to drive a small lift amount to control the injection quantity. A control device for a fuel injection device configured to satisfy such a requirement will be described hereinafter with reference to FIGS. 1 to 13. Incidentally, all the drawings are illustrated schematically, and a relative magnitude relationship is made different from an actual one or detailed parts are omitted in order to facilitate understanding.

Figure 1:
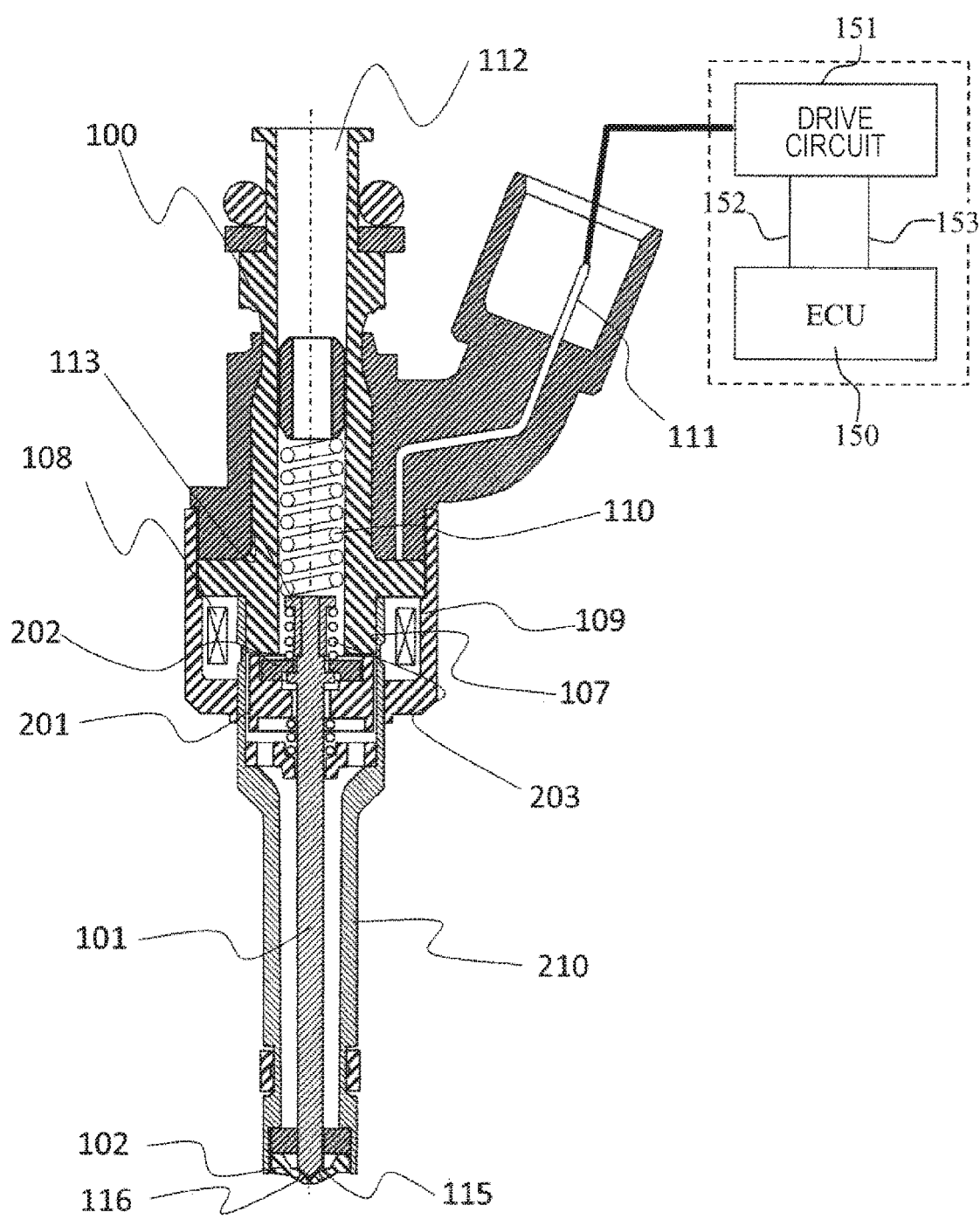
FIG. 1 is a vertical cross-sectional view of a fuel injection device according to an embodiment of the present invention, and a diagram illustrating a configuration of a drive circuit and an engine control unit (ECU) which are connected to the fuel injection device.

FIG. 1 illustrates an example of a basic configuration of a fuel injection device and a drive device thereof according to the present embodiment. A vertical cross-sectional view of the fuel injection device and an example of a configuration of a drive circuit 151 for drive of the fuel injection device and an engine control unit (ECU) 150 are illustrated. In the present embodiment, the ECU 150 and the drive circuit 151 are configured as separate devices, but the ECU 150 and the drive circuit 151 may be configured as an integrated device. Incidentally, the device constituted by the ECU 150 and the drive circuit 151 will be referred to as a drive device. The ECU 150 receives a signal indicating an engine state from various sensors and performs computation of the injection pulse width, configured for control of the injection quantity to be injected from the fuel injection device according to an operating condition of an internal combustion engine, and an injection timing.

Figure 2:
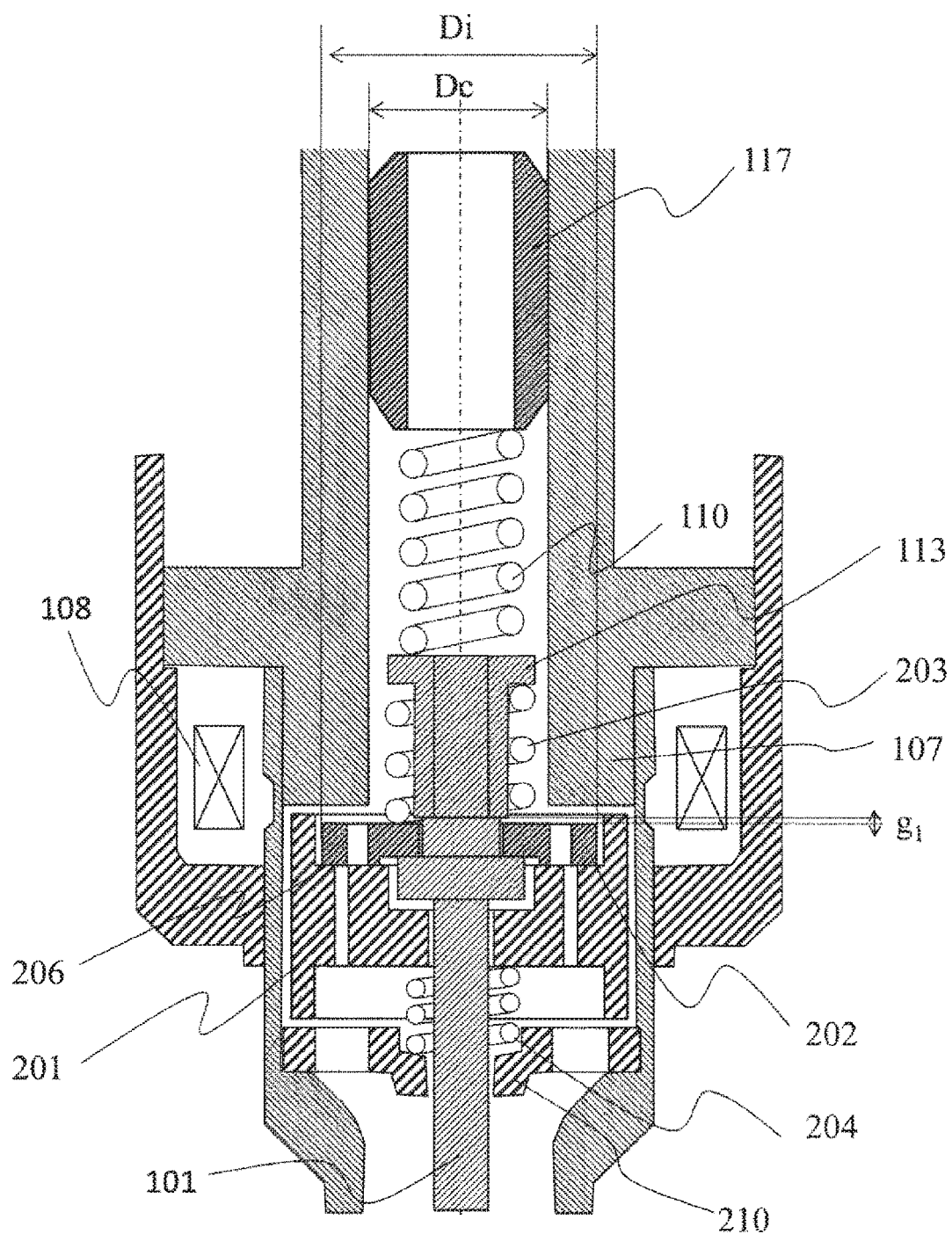
FIG. 2 is a diagram illustrating an enlarged view of a drive unit structure in a valve-closed state of the fuel injection device according to the embodiment of the present invention.

The injection pulse output from the ECU 150 is input to the drive circuit 151 of the fuel injection device via a signal line 153. The drive circuit 151 controls a voltage to be applied to a solenoid 108 and supplies a current through a terminal 111. The ECU 150 performs communication with the drive circuit 151 via a communication line 152 and can switch the drive current generated by the drive circuit 151 according to the pressure of fuel supplied to the fuel injection device or the operating condition and change setting values of the current and time. The drive circuit 151 can change a control constant by communication with the ECU 150, and it is possible to change a setting value of a current waveform according to the control constant. FIG. 2 is an enlarged cross-sectional view of a fixed iron core portion according to the present embodiment. FIG. 3 is a view for describing an operation at the time of drive according to the embodiment of the present invention. FIG. 4 are graphs illustrating a displacement of a valve body and a drive current waveform when performing a large stroke and a small stroke, respectively, according to the embodiment of the present invention.

An overall configuration of a fuel injection valve and flow of fuel will be described with reference to FIG. 1. Fuel to be supplied to the fuel injection valve is supplied from a fuel supply port 112 and supplied to the inside of a fuel injection valve 100. Although a filter that removes foreign matters in the fuel is generally attached to the fuel supply port 112, the illustration thereof is omitted. The fuel injection valve 100 has a valve body 101 therein, and a valve seat member 102 is provided at a position opposing the valve body 101. The valve seat member 102 has a fuel injection hole 116. In addition, a convex portion (a flange portion 113) convex to the outer diameter side is attached to the valve body 101 on the upstream side. The flange portion 113 and the valve body 101 are formed as separate bodies in the present embodiment, but may be formed integrally. A spring 110 is provided so as to be in contact with an upper surface of the flange portion 113, and the valve body 101 is biased in a valve closing direction (lower direction in FIG. 1) by the spring 110 via the flange portion 113.

The valve body 101 has a seat portion 115 which is in contact with the valve seat member 102 to form a seal seat, and has a structure that seals fuel as the valve body 101 is pressed against the valve seat member 102 by the spring 110 when there is no energization of the solenoid 108 so that a valve body seat portion on a distal end side of the valve body comes into contact with the seat portion 115. A nozzle holder 210 is arranged on the outer diameter side of the valve body 101, and the valve seat member 102 is press-fitted to a downstream distal end. An outer-diameter-side movable element 201 and an inner-diameter-side movable element 202 are contained in the nozzle holder 210.

The configuration of the fuel injection valve of the present embodiment will be described in detail with reference to FIG. 2. An intermediate spring 203 is provided between the inner-diameter-side movable element 202 and the flange portion 113 of the valve body 101. The intermediate spring 203 is provided so as to come into contact with the lower surface of the flange portion 113 of the valve body 101 and biases an upper surface of the inner-diameter-side movable element 202. As a result, the intermediate spring 203 acts to bias the inner-diameter-side movable element 202 in a direction (downstream direction) separating the inner-diameter-side movable element 202 from the flange portion 113 of the valve body 101.

Here, a rod guide 210 guiding the valve body 101 is press-fitted to a large-diameter portion of the nozzle holder 210 on the downstream side of the outer-diameter-side movable element 201. A zero spring 204 is provided between the outer-diameter-side movable element 201 and the rod guide 210. The zero spring 204 acts to bias the outer-diameter-side movable element 201 in the direction separating the outer-diameter-side movable element 201 from the rod guide 210 (upstream direction). Absolute values of a biasing force Fz of the zero spring 204 and a biasing force Fm of the intermediate spring 203 are set such that the value of the intermediate spring 203 is larger.

Thus, the inner-diameter-side movable element 202 is biased to the downstream side by the intermediate spring 203 in a state where the solenoid 108 is not energized, that is, in a valve-closed state where the valve body 101 and the valve seat member 102 are in contact with each other. Further, the inner-diameter-side movable element 202 is stationary via a contact surface 206 provided between a downstream surface of the inner-diameter-side movable element 202 and an upstream surface of the outer-diameter-side movable element 201. At this time, the outer-diameter-side movable element 201 is biased to the upstream side by the zero spring 204, and the stationary state is maintained via the contact surface 206 similarly as described above.

In this stationary state, a gap g1 is provided between the upstream surface of the inner-diameter-side movable element 202 and a downstream surface of the flange portion 113 of the valve body. An outer diameter Di of the inner-diameter-side movable element 202 is set to be larger than an inner diameter Dc of the fixed iron core 107. As a result, when the solenoid 108 is energized, a magnetic flux is generated in each gap between the outer-diameter-side movable element 201 and the fixed iron core 107 and between the inner-diameter-side movable element 202 and the fixed iron core 107, thereby generating a magnetic attractive force.

Next, an operation of the fuel injection valve 100 will be described with reference to FIG. 3. FIG. 3 illustrates a schematic drawing in order to facilitate understanding. FIG. 3(a) illustrates a state (hereinafter, a valve-closed state) where the solenoid 108 is not energized and the valve body 101 and the valve seat member 102 are in contact with each other. From the state of FIG. 3(a), the solenoid 108 is energized with a current during a small stroke illustrated in an upper graph of FIG. 4(a). Specifically, by flowing a maximum drive current Ipeak S in the upper graph of FIG. 4(a) through the solenoid 108, a magnetic flux is generated in the fixed iron core 107, a housing 109, the inner-diameter-side movable element 202, and the outer-diameter-side movable element 201 constituting a magnetic circuit of a solenoid valve, and a magnetic attractive force is generated among the fixed iron core 107, the outer-diameter-side movable element 201, the fixed iron core 107, and the inner-diameter-side movable element 202.

As illustrated in Formula (1), when the sum of a magnetic attractive force Fi acting between the inner-diameter-side movable element 202 and the fixed iron core 107 and a magnetic attractive force Fo acting between the outer-diameter-side movable element 201 and the fixed iron core 107 is larger a difference between the biasing force Fm of the intermediate spring 203 and the biasing force Fz of the zero spring 204, the inner-diameter-side movable element 201 and the outer-diameter-side movable element 202 are attracted toward the fixed iron core 107 and start operating.

$$Fo+Fi>Fm-Fz \qquad \text{Formula (1)}$$

As illustrated in FIG. 3(b), when the inner-diameter-side movable element 202 is displaced by the gap g1 provided in advance between the flange portion 113 of the valve body and the inner-diameter-side movable element 202, the inner-diameter-side movable element 202 collides with the flange portion 113 of the valve body.

At this time, since kinetic energy stored in the inner-diameter-side movable element 202 and the outer-diameter-side movable element 201 is used for a valve opening operation of the valve body 101, it is possible to improve the responsiveness of the valve opening operation or to open the valve even under high fuel pressure by using the kinetic energy. The gap g1 is called a preliminary stroke, and it is possible to obtain a so-called run-up period before the valve body 101 starts to move by the gap g1.

When energization to the solenoid 108 is continued from the state of FIG. 3(b), the outer-diameter-side movable element 201 and the inner-diameter-side movable element 202 continue to further move to the upstream side. Further, when the outer-diameter-side movable element 201 is displaced by the gap g2 provided in advance between the outer-diameter-side movable element 201 and the fixed iron core 117, the outer-diameter-side movable element 201 collides with the downstream surface of the fixed iron core 107 so that the movement of the outer-diameter-side movable element 201 is restricted.

A state at this time is illustrated in FIG. 3(c). As illustrated in FIG. 3(c), a current to be supplied to the solenoid 108 satisfies a relationship among forces in the following Formulas (2) and (3) so that the valve body 101 is controlled so as to have a short stroke. This short stroke is indicated by a maximum lift amount of a lift amount Lift S illustrated in the lower graph of FIG. 4(a). Thereafter, it is controlled such that a holding current Ihold S smaller than the maximum drive current Ipeak S flows through the solenoid 108, and thus, the state where the outer-diameter-side movable element 201 is in contact with the downstream surface of the fixed iron core 107 is maintained so that the state of FIG. 3(c) is maintained.

Formula (2) is a condition where the sum of the magnetic attractive force Fo of the outer-diameter-side movable element 201 and the magnetic attractive force Fi of the inner-diameter-side movable element 202 becomes larger than the sum of the fluid force Fp caused by a fluid acting on the valve body 101 and a biasing force Fs by the spring 110. Formula (3) is a condition where the magnetic attractive force Fi of the inner-diameter-side movable element 202 becomes smaller than the sum of a differential pressure Fp caused by a fluid acting on the valve body 101 and a biasing force Fs by the spring 110.

$$Fs+Fp<Fi+Fo \qquad \text{Formula (2)}$$

$$Fs+Fp>Fi \qquad \text{Formula (3)}$$

That is, the outer-diameter-side movable element 201 and the inner-diameter-side movable element 202 start to move by satisfying Formula (2), but it becomes difficult to move the valve body 101 only by the inner-diameter-side movable element 202 after the movement of the outer-diameter-side movable element 201 is restricted by satisfying Formula (3), and the movement of the outer-diameter-side movable element 201 and the inner-diameter-side movable element 202 is completed in the state of FIG. 3(c). In the present embodiment, this stroke is referred to as the short stroke, and the state in FIG. 3(c) is referred to as a short stroke state.

In the short stroke state, a stroke amount of the valve body 101 is a gap g2−g1. When the current to the solenoid 108 is cut off from the short stroke state, the magnetic flux generated between the inner-diameter-side movable element 201 and the outer-diameter-side movable element 202 disappears. Further, when the magnetic attractive force becomes smaller than the biasing force Fs of the spring and the fluid force Fp acting on the valve body 101, the inner-diameter-side movable element 202 and the outer-diameter-side movable element 201 start to displace in the downstream direction. Accordingly, the valve body 101 starts the valve closing operation and eventually collides with the valve seat member 102, thereby completing the valve closing. Behaviors of the valve body 101 in a series of short strokes are schematically illustrated in FIG. 4(a).

Meanwhile, control is performed so as to satisfy Formula (4) as illustrated in FIG. 3(d) by setting a value of the current to be supplied to the solenoid 108 to a current in the large stroke illustrated in the upper graph of FIG. 4(b). Specifically, by flowing a maximum drive current Ipeak L in the upper graph of FIG. 4(b) through the solenoid 108, the inner-diameter-side movable element 202 further moves in the upstream direction from the state of FIG. 3(c) so that the valve body 101 is controlled to take the long stroke to move in the upstream direction (valve opening direction). Incidentally, the maximum drive current Ipeak L in the case of the long stroke is set to be larger than the maximum drive current Ipeak S in the case of the short stroke.

Formula (4) represents a condition where the magnetic attractive force Fi of the inner-diameter-side movable element 202 becomes larger than the sum of a differential pressure Fp caused by a fluid acting on the valve body 101 and a biasing force Fs by the spring 110. The valve body 101 is controlled so as to take the long stroke by satisfying the condition of the Formula (4).

$$Fs+Fp>Fi \qquad \text{Formula (4)}$$

The state illustrated in FIG. 3(*d*) is referred to as a long stroke state. After the maximum drive current Ipeak L in the upper graph of FIG. 4(*b*) is supplied to the solenoid 108, the long stroke state of FIG. 3(*d*) is maintained by flowing a holding current Ihold L, which is lower than the maximum drive current Ipeak L, through the solenoid 108. Incidentally, the long stroke corresponds to a maximum lift amount of a lift amount Lift L illustrated in the lower graph of FIG. 4(*b*).

In the long stroke, a stroke amount (maximum lift amount of the lift amount Lift L) of the valve body 101 is a gap g2−g1+g3. As illustrated in the upper graph of FIG. 4(*b*), the magnetic flux generated in the inner-diameter-side movable element 202 disappears when the current to the solenoid 108 is cut off from the long stroke state of FIG. 3(*d*). Further, when the magnetic attractive force Fi becomes smaller than the biasing force Fs of the spring 110 and the fluid force Fp acting on the valve body 101, the inner-diameter-side movable element 202 is displaced in the downstream direction (valve closing direction). The magnetic flux begins to disappear from the inner diameter, and further, the inner-diameter-side movable element 202 shifts to the valve closing operation earlier than the outer-diameter-side movable element 201 due to the fluid force and the biasing force of the spring 110. As a result, the inner-diameter-side movable element 202 collides with the outer-diameter-side movable element 201 when moving toward the downstream side by a gap g3 against the outer-diameter-side movable element 201. By this collision, the inner-diameter-side movable element 202 vigorously displaces the outer-diameter-side movable element 201 in the downstream direction (valve closing direction). Along with this movement, the valve body 101 starts the valve closing operation and eventually collides with the valve seat member 102, thereby completing the valve closing. Behaviors of the valve body 101 in a series of long stroke states are schematically illustrated in FIG. 4(*b*). The valve opening and closing operations of the fuel injection valve 100 have been described as above.

Figure 10:
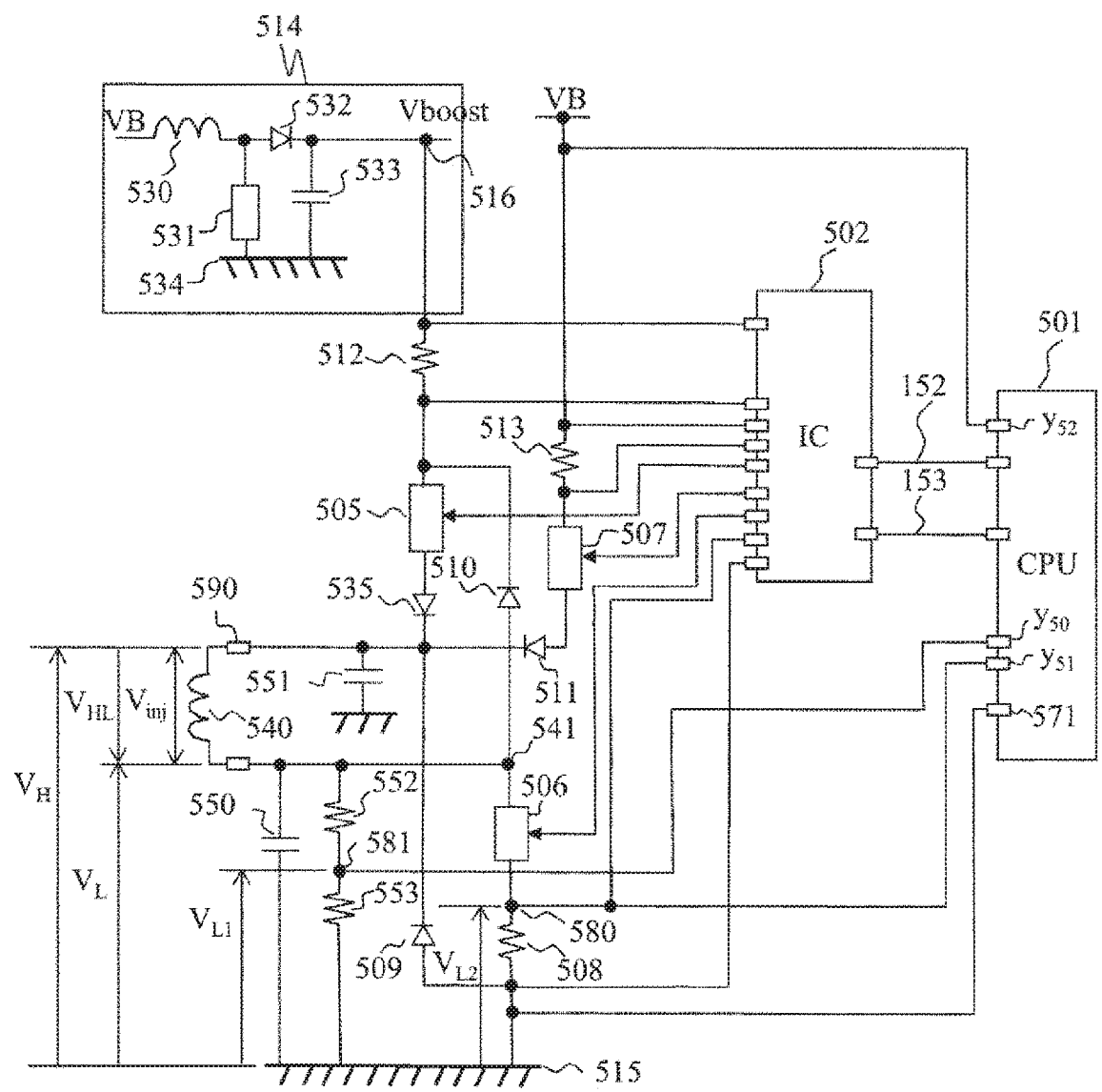
FIG. 10 is a diagram illustrating details of a drive device and the engine control unit (ECU) for the fuel injection device according to the embodiment of the present invention.

Next, the configuration of the drive device for fuel injection devices according to the present embodiment will be described with reference to FIG. 10. FIG. 10 is a diagram illustrating details of the drive circuit 151 and the ECU 150 of the fuel injection device.

A CPU 501 is built in, for example, the ECU 150, and receives signals, which indicate each state of the engine, of the pressure sensor mounted on a fuel supply pipe upstream of the fuel injection device, an A/F sensor to measure an inflow air quantity into an engine cylinder, an oxygen sensor to detect the oxygen concentration in an exhaust gas emitted from the engine cylinder, a crank angle sensor and the like from the above-described various sensors. In response to these signals, the CPU 501 performs computation of the injection pulse width, configured for control of the injection quantity to be injected from the fuel injection device according to an operating condition of an internal combustion engine, and an injection timing. In addition, the CPU 501 also performs computation of the pulse width of an appropriate injection pulse width Ti and the injection timing in accordance with the operating condition of the internal combustion engine and outputs the injection pulse width Ti to a drive IC 502 of the fuel injection device via a signal line 153. Incidentally, the magnitude of the injection quantity is determined by the pulse width of the injection pulse width Ti. Thereafter, the energization and non-energization of switching elements 505, 506 and 507 are switched by the drive IC 502 to supply the drive current to a fuel injection device 540.

The switching element 505 is connected between a high voltage source higher than a voltage source VB, input to the drive circuit, and a terminal of the fuel injection device 540 on the high voltage side. The switching elements 505, 506 and 507 are configured using, for example, a FET or a transistor, and can switch the energization/non-energization of the fuel injection device 540. A step-up voltage Vboost, which is an initial voltage value of the high voltage source, is 65 V, for example, and is generated by stepping up the battery voltage using a step-up circuit 514. The step-up circuit 514 is configured using, for example, a DC/DC converter or the like, or configured using a coil 530 and a transistor 531, a diode 532, and a capacitor 533 in a method. In the step-up circuit 514 in the latter case, a battery voltage VB is applied to a ground potential 534 side when the transistor 531 is turned on. When the transistor 531 is turned off, a high voltage generated in the coil 530 is rectified through the diode 532 so that electric charges are stored in the capacitor 533. This transistor is repeatedly turned on and off until reaching a step-up voltage Vboost, thereby increasing a voltage of the capacitor 533. The transistor 531 is connected to the IC 502 or the CPU 501, and the step-up voltage Vboost output from the step-up circuit 514 is detected by the IC 502 or the CPU 501.

In addition, the switching element 507 is connected between the low voltage source and the high-voltage terminal of the fuel injection device. The low voltage source VB is, for example, the battery voltage, and the voltage value thereof is about 12 to 14 V. The switching element 506 is connected between a terminal of the fuel injection device 540 on the low voltage side and the ground potential 515. The drive IC 502 detects a value of the current flowing in the fuel injection device 540 using resistors 508, 512 and 513 for current detection, switches energization and non-energization of the switching elements 505, 506 and 507 according to the detected current value, and generates a desired drive current. Diodes 509 and 510 are provided to apply a reverse voltage to the solenoid 540 of the fuel injection device and to rapidly reduce the current being supplied to the solenoid 540. The CPU 501 performs communication with the drive IC 502 via the communication line 152 and can switch the pressure of fuel supplied to the fuel injection device 540 and the drive current generated by the drive IC 502 depending on operating conditions. In addition, both ends of each of the resistors 508, 512 and 513 are connected to A/D conversion ports of the IC 502 so that the voltage applied between both ends of each of the resistors 508, 512 and 513 can be detected by the IC 502.

Next, a description will be given regarding a relationship among an injection pulse output from the drive device that drives the electromagnetic type fuel injection device and a drive voltage applied between the terminals of the solenoid 108 of the fuel injection device, a drive current (excitation current), and a displacement amount (valve body movement amount) of the valve body 101 of the fuel injection device according to the present embodiment with reference to FIGS. 11 and 12. Here, current control in the short stroke (small stroke) of FIG. 4(*a*) will be described. Therefore, in the present embodiment, the current control corresponding to the upper graph of FIG. 4(*a*) will be described.

When an injection pulse is input to the drive circuit 151, the drive circuit 151 applies a high voltage to the solenoid 108 from a high voltage source stepped up to a voltage higher than a battery voltage to start the supply of current to the solenoid 108. When the current value reaches a certain value Ipeak S, the application of a high voltage 301 is stopped. Thereafter, the voltage value to be applied is set to 0 V or to be less than 0 V (reverse voltage), and the current value is lowered like a current 302. When the current value becomes smaller than a set first holding current Ihold S1, the drive circuit 151 applies the battery voltage VB by switching of the switching element and performs control to keep a first holding current Ihold S1. The first holding current Ihold S1 is a current value smaller than the maximum drive current Ipeak S and larger than zero, and is set so as to have such a magnitude that the movable element can be held while being attracted to the fixed iron core 107.

Thereafter, when a time set in advance in the ECU elapses, the application of the battery voltage VB is set to 0 V or to be less than 0 V (reverse voltage) to decrease current value like a current 303. When the current value becomes smaller than a set second holding current 305, the drive circuit 151 applies the battery voltage VB by switching of the switching element and performs control to keep the second holding current 305. Incidentally, the second holding current Ihold S2 is a current value smaller than the first holding current Ihold S1 and larger than zero, and is set so as to have such a magnitude that the movable element can be held while being attracted to the fixed iron core 107.

Figure 11:
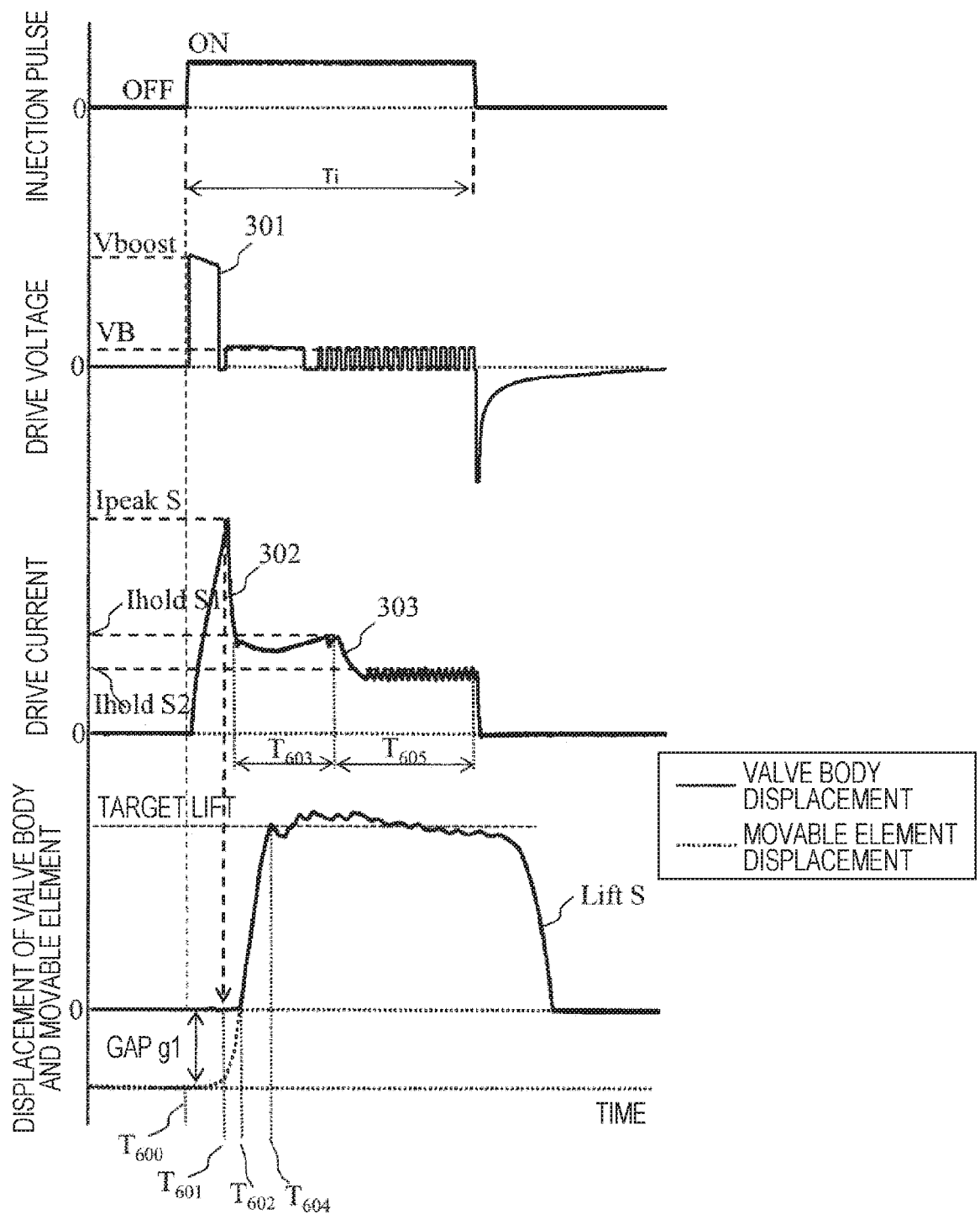
FIG. 11 is a graph illustrating a relationship among an injection pulse, a drive voltage, a drive current applied to a solenoid 108 of the fuel injection device when driving the fuel injection device according to the embodiment of the present invention, displacements of a valve body 101 and the movable element, and time.
Figure 12:
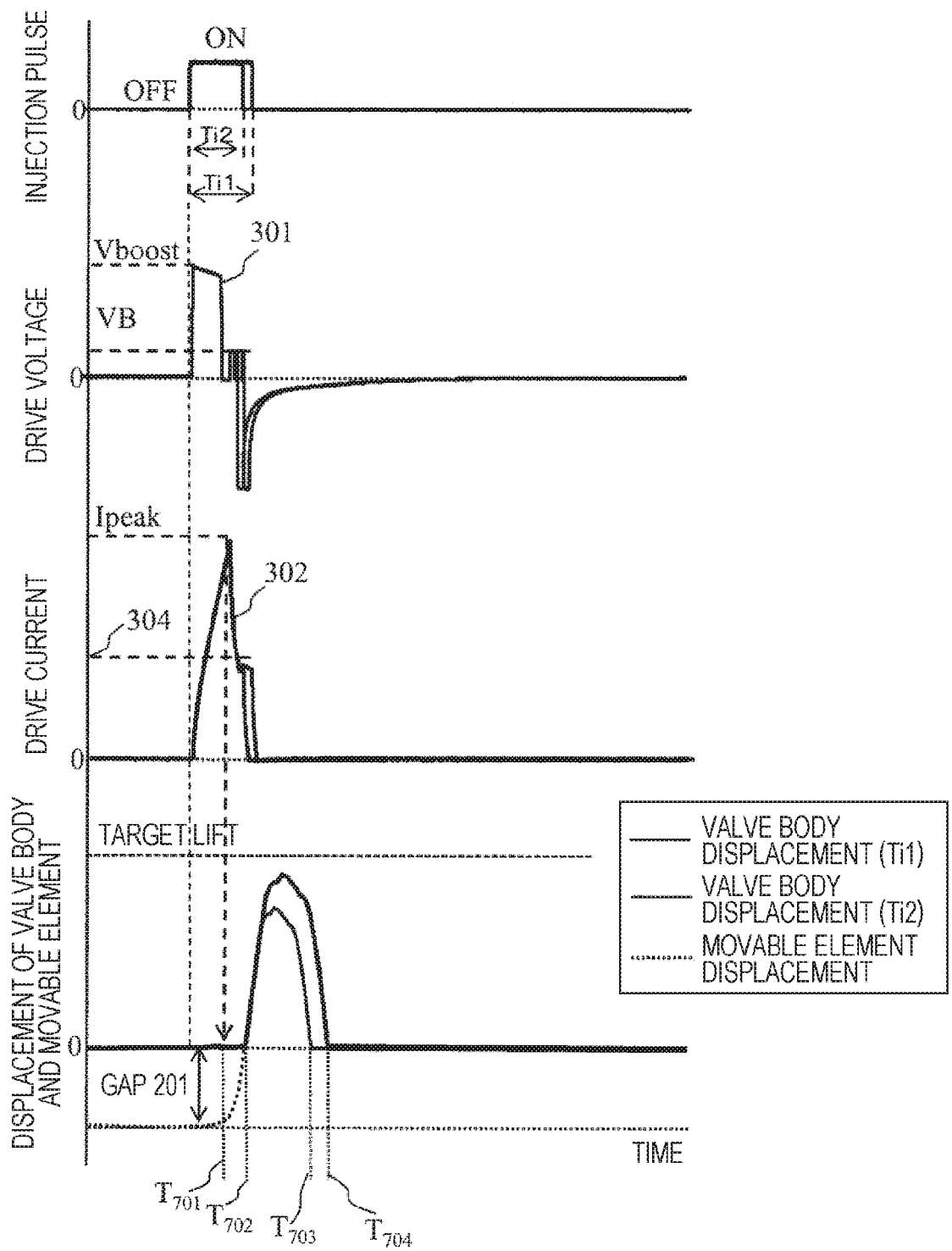
FIG. 12 is a graph illustrating a relationship among an injection pulse, a drive voltage, a drive current applied to a solenoid 108 of the fuel injection device when driving the fuel injection device according to the embodiment of the present invention, displacements of a valve body 101 and the movable element, and time

At this time, the displacement amount of the valve body 101 of the fuel injection device behaves like Lift S in FIG. 11. The movable element starts to be displaced at a timing T600 from the application of the high voltage, and the drive current is controlled to decrease from the maximum current value Ipeak S to the first holding current Ihold S1 or to be cut off at a timing T601 before a timing T602 when the valve body 101 starts to open.

Further, each displacement amount of the outer-diameter-side movable element 201 and the inner-diameter-side movable element 202 reaches the gap g1, and the valve body 101 starts to displace at the timing T602 using an impact force thereof. Thereafter, the valve body 101 reaches a target lift position at a timing T604 in a first holding current section T603. In the present embodiment, the target lift position of the valve body 101 is defined as a lift amount of the valve body 101 at the time when the outer-diameter-side movable element 201 collides with the fixed iron core 107.

After the valve body 101 reaches the target lift position, the inner-diameter-side movable element 202 and the valve body 101 further bounce in the upstream direction due to the influence of the collision between the outer-diameter-side movable element 201 and the fixed iron core 107. After occurrence of such a bouncing phenomenon, the valve body 101 stops at the target lift position, and is turned into the stably open state due to the magnetic attractive force generated by the first holding current Ihold S1 and a force of the return spring in the valve opening direction. Then, the holding current becomes the second holding current Ihold S2, and the valve body 101 shifts to a second holding current section T605, the drive current is cut off at an arbitrary timing Ti, and the magnetic attractive force acting on the outer-diameter-side movable element 201 and the inner-diameter-side movable element 202 decreases. Further, when the force of the spring 110 in the valve closing direction exceeds the magnetic attractive force, the valve body 101 starts a valve closing motion, and the displacement of the valve body 101 is ended at a stage of collision with the seat portion 115, and the fuel injection is also ended.

Incidentally, the control unit of the ECU 150 of the present embodiment flows a first drive current (Ipeak S) through the solenoid 108 so as to control the drive current such that the valve body 101 moves to a height position (a maximum height position of Lift S) lower than a maximum height position (a maximum height position of Lift L) as illustrated in FIG. 11. Alternatively, the drive current is controlled by flowing the first drive current (Ipeak S) through the solenoid 108 such that the inner-diameter-side movable element 202 moves to the height position (the maximum height position of Lift S) lower than the height position (the maximum height position of Lift L) at which the inner-diameter-side movable element 202 collides with the fixed iron core 107.

That is, the control unit of the ECU 150 can accurately control the injection quantity in the intermediate lift region of the valve body 101 by controlling the injection pulse width of the first holding current section T603 of Ihold S1 after supplying the maximum drive current Ipeak S and the injection pulse width of the second holding current section T605 of Ihold S2.

Further, the control unit of the ECU 150 according to the present embodiment flows a second drive current (Ipeak L) to be described later through the solenoid 108 so as to control the drive current such that the valve body 101 moves to the maximum height position (the maximum height position of Lift L). Alternatively, the drive current is controlled by flowing the second drive current (Ipeak L) through the solenoid 108 such that the inner-diameter-side movable element 202 moves to the height position (the maximum height position of Lift L) at which the inner-diameter-side movable element 202 collides with the fixed iron core 107.

That is, the control unit of the ECU 150 can accurately control the injection quantity in the intermediate lift region of the valve body 101 by controlling the injection pulse width of a section (second holding current section T606) in which the holding current Ihold L is supplied after supplying the second drive current (Ipeak L).

Figure 5:
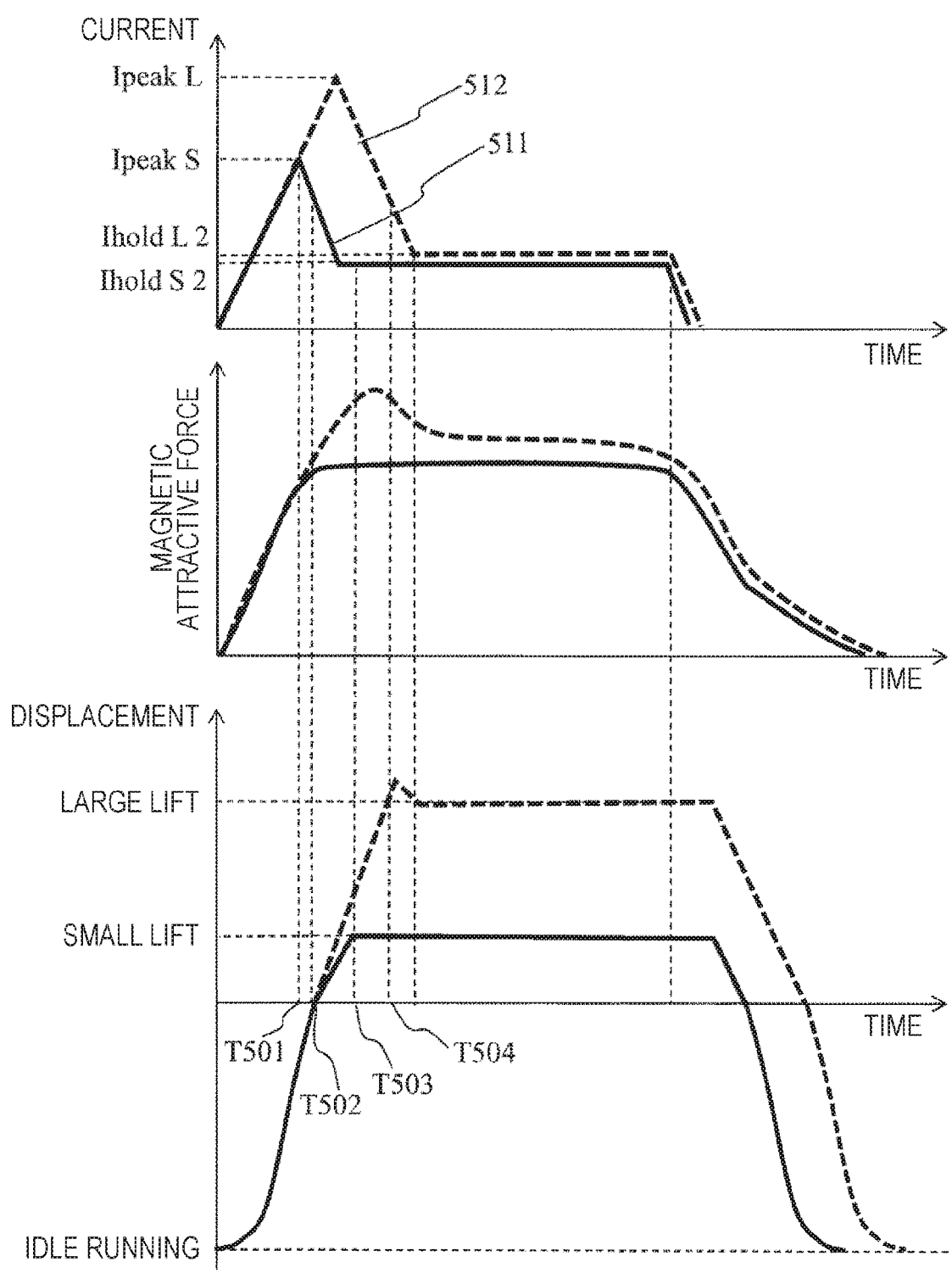
FIG. 5 is a graph illustrating a relationship among a drive current applied to a solenoid 108 of the fuel injection device when driving the fuel injection device according to the embodiment of the present invention, a magnetic attractive force generated in the movable element, displacements of a valve body 101 and the movable element, and time.

Next, switching of a current waveform and a lift amount of the valve body which are features of the present embodiment will be described with reference to FIG. 5. The fuel injection valve switching the lift amount is characterized by shifting from the maximum drive current (Ipeak S) to the holding current (Ihold S2) before starting the lift of the valve body 101 particularly at the time of small lift. Hereinafter, details of the current waveform and an operation of the valve body 101 at the time of small lift will be described.

A timing T501 at which the application of a high voltage (Vboost, 301 in FIG. 11) is stopped and the maximum drive current (Ipeak S) is set is prior to a timing T502 at which the valve body 101 starts to open. That is, the control unit of the ECU 150, which controls the drive voltage or the drive current to be applied to the solenoid 108, controls the drive current such that the maximum drive current (Ipeak S) is supplied to the solenoid 108, and then, the drive current to be supplied to the solenoid 108 decreases from the maximum drive current (Ipeak S) prior to the timing T502 at which the valve body 101 starts to open.

The valve opening is held by the second holding current (Ihold S2) with a little current change with respect to the pulse width prior to a timing T503 at which the valve body 101 collides with the fixed iron core 107 after the timing T502. That is, the control unit of the ECU 150 according to the present embodiment controls the drive current such that the maximum drive current (Ipeak) is supplied to the solenoid 108, and the drive current flowing through the solenoid 108 is cut off by the maximum drive current (Ipeak S) before the valve body 101 starts to open so as to decrease to the holding current Ihold S2 before the valve body 101 collides with the fixed iron core 107.

As a result, the outer-diameter-side movable element 201 and the inner-diameter-side movable element 202 can be brought into the state illustrated in FIG. 3(c) as described above, and the valve body 101 can be displaced with the short stroke.

In other words, the fuel injection device of the present embodiment includes the valve body 101, the solenoid 108, the inner-diameter-side movable element 202 and the outer-diameter-side movable element 201 to open the valve body 101. Further, a fuel injection system of the present embodiment includes the fuel injection device and the control device (ECU 150) for controlling the fuel injection device. The control unit of the control device (ECU 150) flows the maximum drive current (Ipeak S) through the solenoid 108, and then, performs control such that the drive current to be supplied to the solenoid 108 decreases from the maximum drive current (Ipeak S) before the valve body 101 starts to open.

Figure 8:
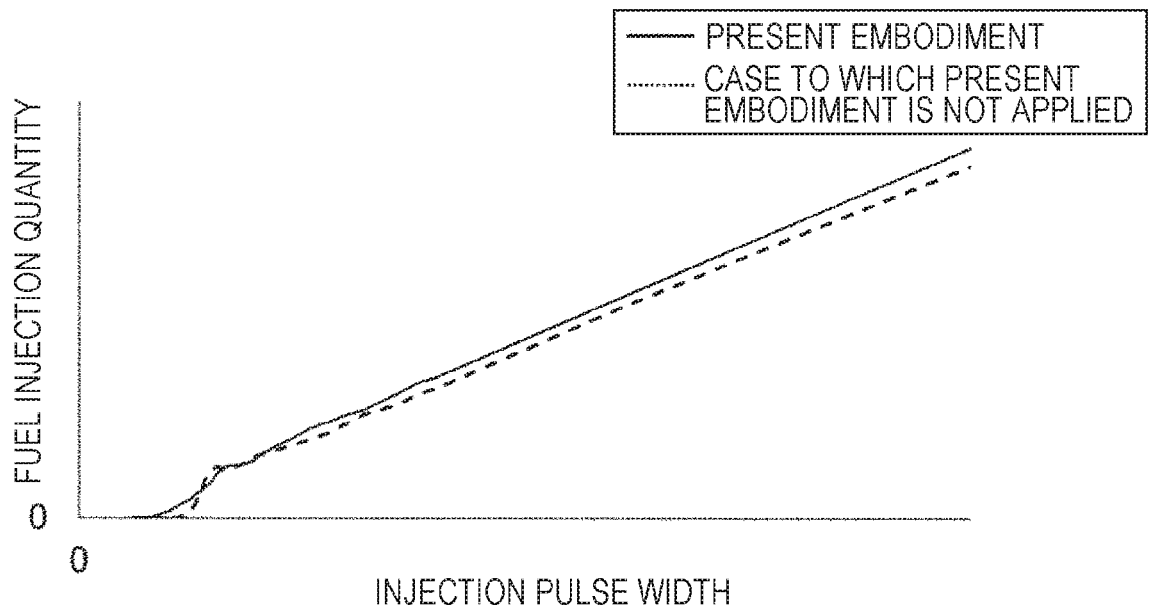
FIG. 8 is a graph illustrating a relationship between an injection pulse width Ti output from the ECU of FIG. 1 and a fuel injection quantity at that time according to the embodiment of the present invention.
Figure 9:
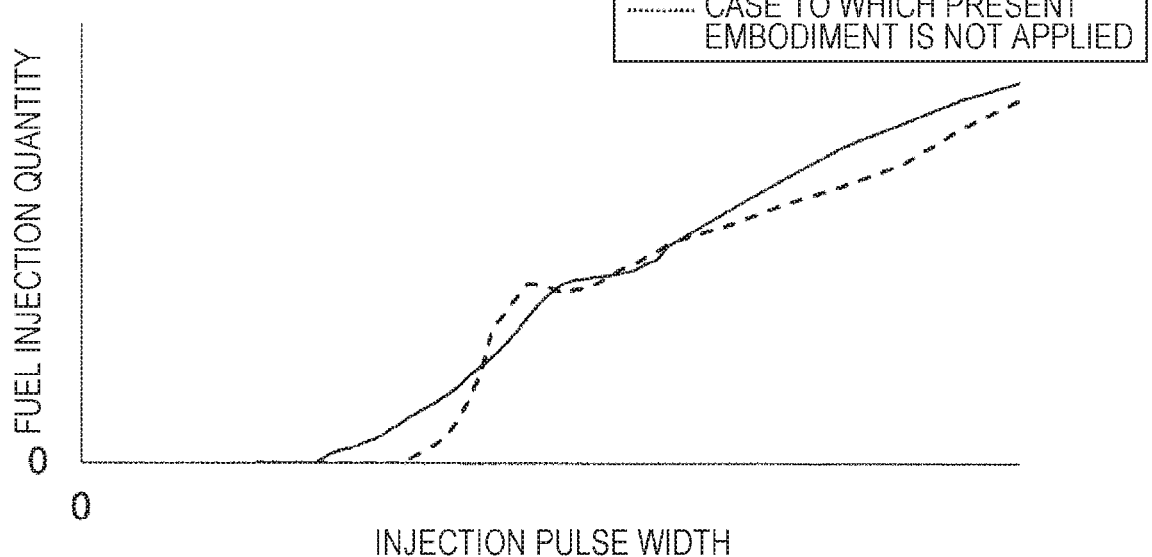
FIG. 9 is a graph illustrating the relationship between the injection pulse width Ti output from the ECU of FIG. 1 and the fuel injection quantity at that time according to the embodiment of the present invention by magnifying Ti in an intermediate lift region.

If the maximum drive current Ipeak S continues to flow even after the fuel injection device (the valve body 101) starts opening, the magnetic attractive force in the valve opening direction becomes too strong, and thus, there is a risk that the displacement amount of the valve body 101 and movement speed of the valve body 101 with respect to the pulse width increase too much. As a result, an increment of the injection quantity with respect to the injection pulse width increases as illustrated in the example of FIG. 8 to which the present embodiment is not applied, and thus, it becomes difficult to control the injection quantity in a low injection quantity region.

On the other hand, the control method of the fuel injection device as described above is adopted according to the present embodiment so that the drive current is decreased to the maximum drive current Ipeak S before the valve body 101 starts to open. Therefore, it is possible to suppress the magnetic attractive force and the increase in the injection quantity with respect to the injection pulse width, and thus, the injection quantity control in the low injection quantity region can be easily performed. That is, it is possible to easily control the injection quantity when the valve body 101 is controlled with the short stroke. In addition, an electromagnetic characteristic that a magnetic attractive force necessary for valve closing is generated before full lift has been adopted in the present embodiment adopts in the case of performing the small lift (short stroke). That is, the magnetic attractive force Fo of the outer-diameter-side movable element 201 and the magnetic attractive force Fi of the inner-diameter-side movable element 202 are generated so as to satisfy the above-described Formula (2) before the outer-diameter-side movable element 201 collides with the fixed iron core 107. In addition, an electromagnetic characteristic that it is possible to shift to the holding current before the full lift of the small lift (short stroke) has been adopted. That is, the current flows through the solenoid 108 such that the drive current decreases from the maximum drive current Ipeak S before the outer-diameter-side movable element 201 collides with the fixed iron core 107.

After the valve body 101 or the outer-diameter-side movable element 201 is fully lifted, the magnetic attractive force does not increase transiently during the application of the holding current Ihold S2. Therefore, the magnetic attractive force is constant during the full lift of the small lift even if the current is cut off so that a valve closing delay also becomes constant. As a result, it is possible to suppress generation of an extra magnetic attractive force at the end of a drive pulse and shorten the valve closing delay.

Since a small injection quantity to be injected at the time of opening the valve body 101 with the small lift (short stroke) is controlled in a current region with the second holding current Ihold S2 where there is a small current change, a change of the current value with respect to the injection pulse width Ti is small. In this case, a length of the second holding current Ihold S2 is increased. Thus, there is an effect of suppressing the phenomenon that an increment of the displacement of the valve body with respect to an increment of the injection pulse width Ti becomes too large. That is, it is possible to suppress the increase in the injection quantity with respect to the injection pulse width, and thus, the injection quantity control in the low injection quantity region can be easily performed.

As described above, it is possible to suppress transient growth of the magnetic attractive force and to suppress overshoot of the valve body with the low lift. Therefore, it is possible to reduce the injection quantity in the case of the low lift and the low pulse.

On the other hand, the peak current (Ipeak L) is applied after the start of valve opening in case of the large lift (long stroke). That is, the outer-diameter-side movable element 201 collides with the fixed iron core 107 to form the state illustrated in FIG. 3(c), and then, the inner-diameter-side movable element 202 further moves to the upstream side and collides with the fixed iron core 107 in the present embodiment as described above.

In this case, since it is possible to increase the magnetic attractive forces acting on the outer-diameter-side movable element 201 and the inner-diameter-side movable element 202, the fuel injection device can operate even against an increase in fuel pressure. Accordingly, there is an effect of improving a maximum fuel pressure at which the fuel injection device can operate, that is, a maximum operating fuel pressure. For example, there is an effect that fuel can be injected by smoothly opening the valve even under a high-pressure environment with a fuel pressure of 30 MPa or higher.

Incidentally, the large lift (long stroke) and the small lift (short stroke) can be realized with the outer-diameter-side movable element 201 and the inner-diameter-side movable element 202 in the above description as illustrated in FIGS. 2 and 3, but the present embodiment is not limited thereto. That is, the invention can be applied to a configuration in which a single movable element is used and a case where the movable element collides with the fixed iron core 107 is defined as a large lift (long stroke) and a case where the movable element is controlled so as not to collide with the fixed iron core 107 is defined as a small lift (short stroke). This small lift (short stroke) may be called an intermediate stroke.

In this case, when the control unit of the ECU 150 in the present embodiment controls the drive current such that the drive current to be supplied to the solenoid 108 decreases from the maximum drive current Ipeak S before the valve body 101 starts to open in the case of driving the valve body 101 with the intermediate stroke Lift S smaller than the maximum stroke Lift L. On the other hand, in the case of driving the valve body 101 with the maximum stroke Lift L, the control unit of the ECU 150 controls the drive current such that the maximum drive current Ipeak L is supplied to the solenoid even after the valve body 101 starts opening, and then, the drive current to be supplied to the solenoid 108 decreases from the maximum drive current Ipeak L.

When describing with the structure in FIGS. 2 and 3, the control unit of the ECU 150 may control the drive current such that the drive current to be supplied to the solenoid 108 decreases from the maximum drive current (Ipeak L) to the holding current (Ihold L2) after the maximum drive current (Ipeak) is supplied to the solenoid 108 and before the inner-diameter-side movable element 202 collides with the fixed iron core 107 in the case of driving the valve body 101 with the large lift (long stroke) in the present embodiment.

Here, the movable element in the present embodiment is constituted by a first movable core (the inner-diameter-side movable element 202) which has a first opposing surface that opposes the fixed iron core 107 (magnetic core), the first opposing surface being attracted by the fixed iron core 107, and a second movable core (the outer-diameter-side movable element 201) which is formed separately from the first movable core (the inner-diameter-side movable element 202) and has a second opposing surface that opposes the magnetic core, the second opposing surface being attracted to the magnetic core.

Further, the control unit that controls the drive voltage or the drive current to be applied to the solenoid 108 controls the drive current such that the drive current to be supplied to the solenoid 108 decreases from the maximum drive current Ipeak S before the valve body 101 starts to open when only the second movable core (the outer-diameter-side movable element 201) is brought into contact with the fixed iron core 107.

On the other hand, when the second movable core (the outer-diameter-side movable element 201) and the first movable core (the inner-diameter-side movable element 202) are brought into contact with the fixed iron core 107, the drive current is controlled such that the maximum drive current Ipeak L is supplied to the solenoid 108 even after the valve body 101 starts opening, and then, the drive current to be supplied to the solenoid 108 decreases from the maximum drive current Ipeak L.

In addition, it is configured such that a second gap g2 between the second opposing surface of the second movable core (the outer-diameter-side movable element 201) and the fixed iron core 107 is smaller than a first gap (g2+g3) between the first opposing surface of the first movable core (the inner-diameter-side movable element 202) and the fixed iron core 107 in the valve-closed state (FIG. 3(a)) of the fuel injection device as described above with reference to FIG. 3. In addition, the fuel injection device (fuel injection valve 100) of the present embodiment is configured such that a gap g1 is formed between the second movable core (the outer-diameter-side movable element 201) and the valve body (the flange portion 113) in the valve-closed state, and the second movable core (the outer-diameter-side movable element 201) is engaged with the valve body (the flange portion 113) when the second movable core is moved by an amount corresponding to the gap in the case of starting to move from the valve-closed state.

In addition, in the valve-closed state (FIG. 3(a)), the fuel injection valve 100 is configured such that the second gap g2 between the second opposing surface of the second movable core (the outer-diameter-side movable element 201) and the fixed iron core 107 is smaller than the first gap (g2+g3) between the first opposing surface of the first movable core (the inner-diameter-side movable element 202) and the fixed iron core 107, and the second gap g2 is smaller than the gap formed between an upper surface of a recessed portion of the second movable core (the outer-diameter-side movable element 201) and the valve body (the flange portion 113). In addition, the fuel injection valve 100 is configured such that the second gap g2 is equal to or less than a half of the gap formed between the upper surface of the recessed portion of the second movable core (the outer-diameter-side movable element 201) and the valve body (the flange portion 113).

In the present embodiment, the control unit of the ECU 150 controls the drive current to be supplied to the solenoid 108 such that a lift amount g2−g1+g3 by which the valve body 101 moves at the timing when the second movable core (the outer-diameter-side movable element 201) and the first movable core (the inner-diameter-side movable element 202) are brought into contact with the fixed iron core 107 is larger than a lift amount g2 by which the valve body 101 moves at the timing (FIG. 3(c)) when only the second movable core (the outer-diameter-side movable element 201) is brought into contact with the fixed iron core 107.

In the present embodiment, when only the second movable core (the outer-diameter-side movable element 201) is brought into contact with the fixed iron core 107, the control unit of the ECU 150 performs control such that the drive current to be supplied to the solenoid 108 decreases from the maximum drive current Ipeak S before the valve body 101 starts to open, and then, the drive current is lowered to the holding current Ihold S smaller than the maximum drive current Ipeak S before the valve body 101 reaches the maximum stroke Lift S.

In addition, in the present embodiment, when only the second movable core (the outer-diameter-side movable element 201) is brought into contact with the fixed iron core 107, the control unit of the ECU 150 performs control such that the drive current to be supplied to the solenoid 108 decreases from the maximum drive current Ipeak S before the valve body 101 starts to open, and then, the drive current is lowered to the holding current Ihold S smaller than the maximum drive current Ipeak S before the valve body 101 starts to open.

In addition, in the present embodiment, when only the second movable core (the outer-diameter-side movable element 201) is brought into contact with the fixed iron core 107, the control unit of the ECU 150 performs control such that the drive current to be supplied to the solenoid 108 decreases from the maximum drive current Ipeak S before the valve body 101 starts to open, and then, the drive current is lowered to the first holding current Ihold S1 smaller than the maximum drive current Ipeak S before the valve body 101 starts to open. Then, the drive current is controlled so as to be lowered to the second holding current Ihold S2 smaller than the first holding current Ihold S1 before the valve body 101 reaches the maximum stroke Lift S.

Figure 7:
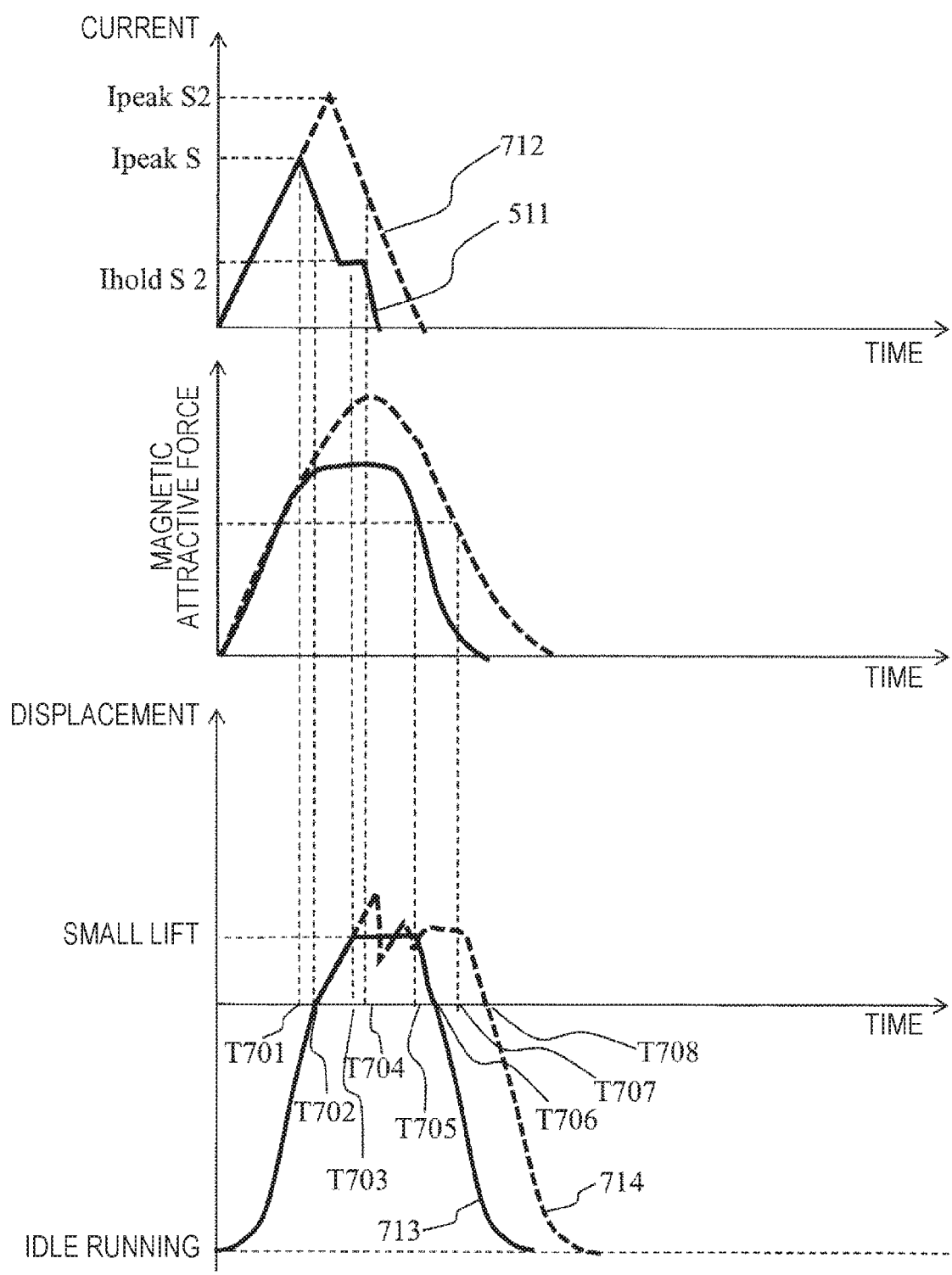
FIG. 7 is a graph illustrating a relationship among a drive current applied to a solenoid 108 of the fuel injection device when driving the fuel injection device according to the embodiment of the present invention, a magnetic attractive force generated in the movable element, displacements of a valve body 101 and the movable element, and time.

Behaviors of the valve body when the small lift (short stroke), which is the feature of the present embodiment, and the small drive pulse are applied to the fuel injection valve will be described with reference to FIG. 7. A current waveform 511 has the same waveform as in FIG. 5, and the peak current (Ipeak S) is cut off at a timing T701 prior to a timing T702 at which the lift of the valve body 101 starts, and shifts to the first holding current (Ipeak S2) prior to a timing T703 at which the valve body 101 reaches the small lift. When an energization pulse is cut off at a timing T704, the magnetic attractive force decreases in a delayed manner, the valve body 101 starts to close when the magnetic attractive force is lower than the spring force and the fluid force in the valve closing direction acting on the valve body 101 at a timing T705, and the valve body seat portion of the valve body 101 is seated on the seat portion 115 at a timing T706 so that fuel injection is interrupted.

Next, the magnetic attractive force generated in the movable element and the behavior of the valve body 101 at the time of applying a current waveform 712 in the case where the present embodiment is not applied are indicated by broken lines. Since the peak current (Ipeak S2) is applied after the timing T702 at which the valve body 101 starts to open, the magnetic attractive force is excessively generated. When the full lift of the small lift at which the inner-diameter-side movable element 201 collides with the fixed iron core 107 is completed, the valve body 101 repeatedly vibrates due to an inertial force, and the injection quantity is not stabilized. When the energization pulse is cut off at a timing T704, the magnetic attractive force decreases in a delayed manner, the valve body 101 starts to close when the magnetic attractive force are lower than the spring force and the fluid force in the valve closing direction acting on the valve body 101 at a timing T707, which is larger than the timing T705, and the valve body seat portion of the valve body 101 is seated on the seat portion 115 at a timing T708 so that fuel injection is interrupted.

When the motion of the valve body 101 is compared between a solid line 713 to which the present embodiment is applied and a broken line 714 to which the present embodiment is not applied, the timing at which the valve body seat portion of the valve body 101 is actually seated on the seat portion 115 and the injection of fuel is interrupted greatly differs as in T706 and T708 even when the same drive pulse timing T704 is applied. That is, the magnetic attractive force necessary for opening the valve is generated before the full lift of the small lift by applying the current waveform 511 of the present embodiment. Further, the current shifts to the second holding current Ihold S2 before the full lift of the small lift, and thus, the magnetic attractive force does not increase transiently during the application of the second holding current Ihold S2 after the full lift. Therefore, the magnetic attractive force is constant during the full lift of the small lift even if the current is cut off so that a valve closing delay also becomes constant. It is possible to shorten the valve closing delay as compared with the case where the present embodiment is not applied at the time of the small pulse, and thus, the fuel injection quantity can be reduced.

Figure 6:
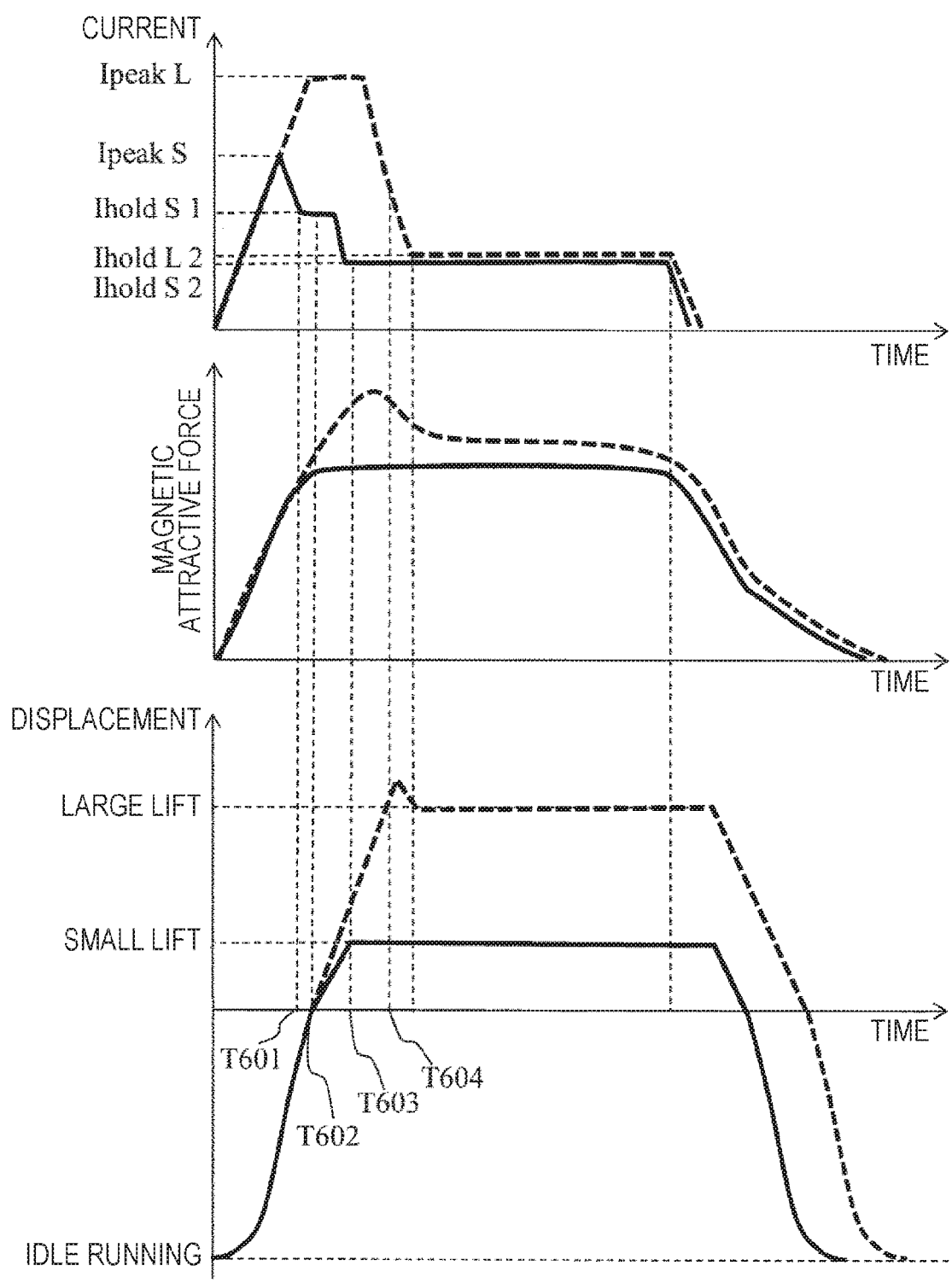
FIG. 6 is a graph illustrating a relationship among a drive current applied to a solenoid 108 of the fuel injection device when driving the fuel injection device according to the embodiment of the present invention, a magnetic attractive force generated in the movable element, displacements of a valve body 101 and the movable element, and time.

A description will be given regarding switching of a current waveform when a coil resistance and an inductance of a fuel injection valve are small and responsiveness of a current is high will be described as another embodiment with reference to FIG. 6.

In the fuel injection valve that switches a lift amount, a current region of the first holding current Ihold S1 set to a value higher than a second holding current value is provided between a current region of the maximum drive current Ipeak S and a current region of the second holding current Ihold S2 at the time of small lift. That is, a control unit of the ECU 150 of the present embodiment flows the maximum drive current (Ipeak S) through the solenoid 108, and decreases the drive current to be supplied to a solenoid 108 before the timing T602 at which the valve body 101 starts to open from the maximum drive current (Ipeak S). Then, control is performed such that the first holding current Ihold S1 lower than the maximum drive current (Ipeak S) flows through the solenoid 108 at the timing T601 prior to the timing T602 at which the valve body 101 starts to open. Thereafter, the drive current is controlled such that the second holding current Ihold S2, which is lower than the first drive current Ihold S1, flows through the solenoid 108 before the timing T603 at which the valve body 101 collides with the fixed iron core 107.

As described above, the maximum drive current Ipeak S shifts to the first holding current Ihold S1 before the start of the lift. In addition, an electromagnetic characteristic that a magnetic attractive force required for valve opening is generated before the full lift of the small lift is adopted. That is, the drive current is controlled such that the magnetic attractive force Fo of the outer-diameter-side movable element 201 and the magnetic attractive force Fi of the inner-diameter-side movable element 202 are generated so as to satisfy the above-described Formula (2) before the outer-diameter-side movable element 201 collides with the fixed iron core 107.

In addition, the electromagnetic characteristic that it is possible to shift to the second holding current Ihold S2 which is lower than the first holding current Ihold S1 prior to the full lift of the small lift is adopted as described above. Since the magnetic attractive force does not increase transiently during the application of the holding current after the full lift, the valve closing delay becomes constant even when the current is cut off during the full lift of the small lift since the magnetic attractive force is constant. As above, it is possible to suppress the generation of the extra magnetic attractive force at the end of the drive pulse and shorten the valve closing delay.

On the other hand, the drive current is controlled such that the peak current (Ipeak L) is maintained and continuously supplied to the solenoid 108 even after the valve starts opening at the time of large lift. Then, the outer-diameter-side movable element 201 collides with the fixed iron core 107 (FIG. 3(c)), and thereafter, the drive current to be supplied to the solenoid 108 is decreased from the maximum drive current (Ipeak L) to the holding current Ihold L2 before the time 604 (FIG. 3(d)) at which the inner-diameter-side movable element 202 collides with the fixed iron core 107. As a result, it is possible to increase the magnetic attractive forces acting on the outer-diameter-side movable element 201 and the inner-diameter-side movable element 202, and thus, the fuel injection device can operate even against an increase in fuel pressure. Accordingly, there is an effect of improving a maximum fuel pressure at which the fuel injection device can operate, that is, a maximum operating fuel pressure. For example, there is an effect that fuel can be injected by smoothly opening the valve even under a high-pressure environment with a fuel pressure of 30 MPa or higher.

Figure 13:
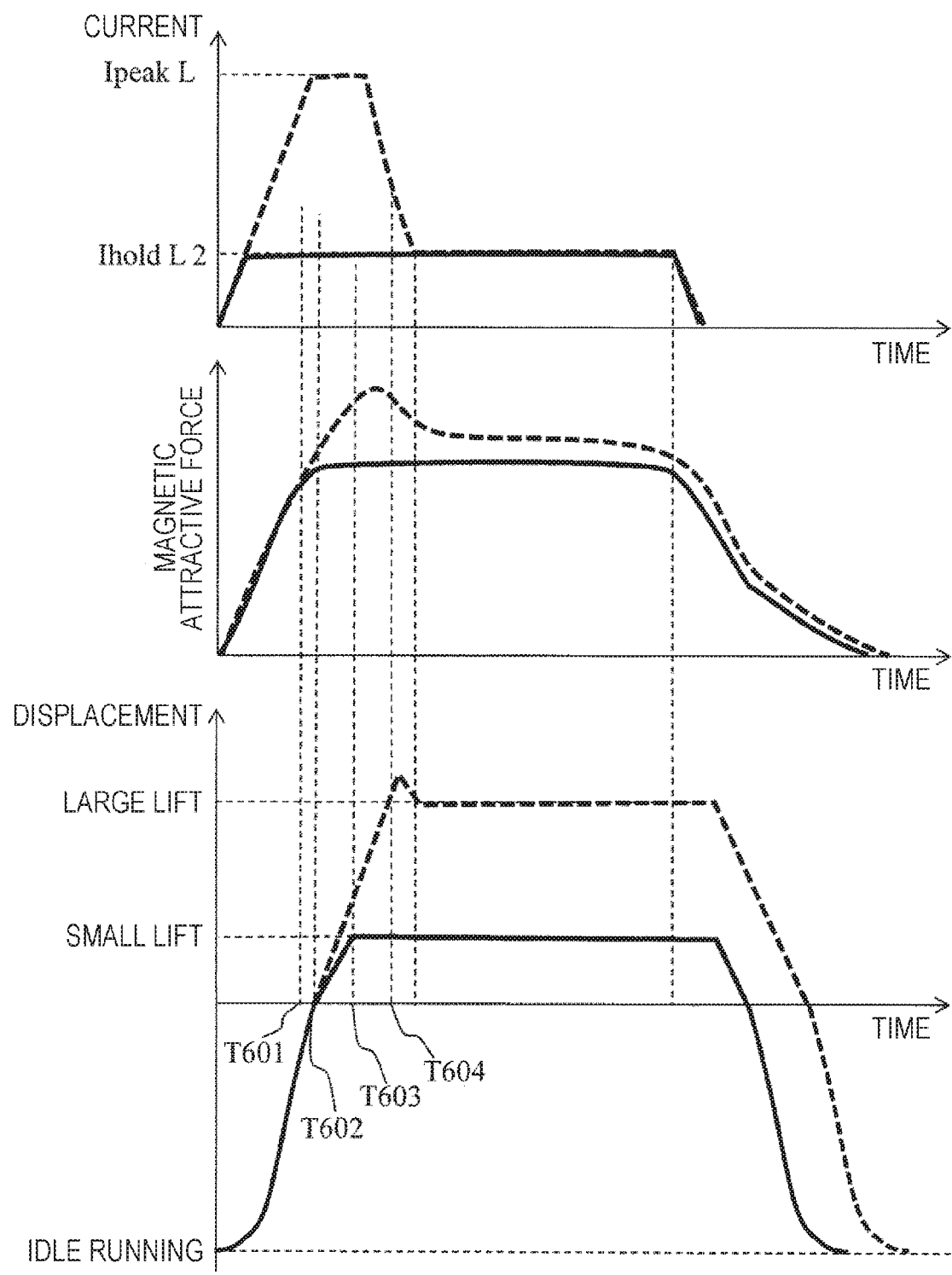
FIG. 13 is a graph illustrating a relationship among a drive current applied to a solenoid 108 of the fuel injection device when driving the fuel injection device according to the embodiment of the present invention, a magnetic attractive force generated in the movable element, displacements of a valve body 101 and the movable element, and time.

Switching of a current waveform different from the above current waveform will be described with reference to FIG. 13. In a fuel injection valve that switches a lift amount, a drive current is controlled such that the second holding current Ihold L2 flows through the solenoid 108 without applying the maximum drive current Ipeak L at the time of small lift. That is, a control unit of an ECU of the present embodiment applies only the holding current when only a second movable core (the outer-diameter-side movable element 201) is brought into contact with the fixed iron core 107.

As described above, the magnetic attractive force does not increase transiently if the maximum drive current Ipeak L is not applied before the start of the lift, and thus, the magnetic attractive force is constant even when the current is cut off during the full lift of the small lift so that the valve closing delay also becomes constant. As above, it is possible to suppress the generation of the extra magnetic attractive force at the end of the drive pulse and shorten the valve closing delay.

On the other hand, the peak current (Ipeak L) is maintained and continuously supplied to the solenoid 108 even after the valve starts opening at the time of large lift. Then, the outer-diameter-side movable element 201 collides with the fixed iron core 107 (FIG. 3(c)), and thereafter, the drive current to be supplied to the solenoid 108 is decreased from the maximum drive current (Ipeak L) to the holding current Ihold L2 before the time 604 at which the inner-diameter-side movable element 202 collides with the fixed iron core 107. It is possible to increase the magnetic attractive forces acting on the outer-diameter-side movable element 201 and the inner-diameter-side movable element 202, and thus, the fuel injection device can operate even against an increase in fuel pressure. Accordingly, there is an effect of improving a maximum fuel pressure at which the fuel injection device can operate, that is, a maximum operating fuel pressure. For example, there is an effect that fuel can be injected by smoothly opening the valve even under a high-pressure environment with a fuel pressure of 30 MPa or higher FIG. 8 illustrates a relationship between an injection pulse width and a fuel injection quantity in the case of driving with a supply current profile according to the present embodiment in comparison with a case where driving is performed with a current waveform to which the present embodiment is not applied. As illustrated in FIG. 8, a slope of the fuel injection quantity with respect to the injection pulse width is substantially constant over the entire injection pulse width. Therefore, the slope of the fuel injection quantity can be reduced as compared with the current waveform to which the present embodiment is not applied. That is, since it is possible to suppress the magnetic attractive force and the increase in the injection quantity with respect to the injection pulse width, and thus, it is possible to easily control the injection quantity in a region with the small pulse width before and after the outer-diameter-side movable element 201 collides with the fixed iron core 107, for example. As a result, it is possible to easily reduce the minimum injection quantity.

According to the above embodiments, it is possible to improve the control accuracy of the injection quantity in the fuel injection valve and the control device thereof in which the lift amount of the valve body is made smaller than the conventional one in order to particularly reduce the minimum injection quantity.

REFERENCE SIGNS LIST 101 valve body
102 valve seat member
107 fixed iron core
108 solenoid
109 housing
110 spring
111 terminal
112 fuel supply port
113 flange portion
115 seat portion
150 engine control unit (ECU)
151 drive circuit
152 communication line
153 signal line
201 outer-diameter-side movable element
202 inner-diameter-side movable element
210 nozzle holder
203 intermediate spring
204 zero spring
301 high voltage
302, 303 current
304 first holding current
305 second holding current
501 CPU
502 drive IC
505, 506, 507 switching element
508, 512, 513 resistor
514 step-up circuit
530 coil
531 transistor
532 diode
533 capacitor

The invention claimed is:

1. A control device for a fuel injection device, the control device comprising a control unit for controlling the fuel injection device, which includes a valve body, a solenoid, a movable core to open the valve body, and a fixed iron core to attract the movable core,
    wherein the movable core includes a first movable core which has a first opposing surface that opposes the fixed iron core, the first opposing surface being attracted by the fixed iron core, and a second movable core which is formed separately from the first movable core and has a second opposing surface that opposes the fixed iron core, the second opposing surface being attracted by the fixed iron core,
    wherein the control unit is configured to control a drive voltage or a drive current being applied to the solenoid by decreasing the drive current from a maximum drive current before the valve body starts to open when only the second movable core is brought into contact with the fixed iron core, thereafter, decreasing the drive current to a first holding current smaller than the maximum drive current before the valve body starts to open, and then decreasing the drive current to a second holding current smaller than the first holding current before the valve body reaches a maximum stroke, and
    wherein the control unit is configured to control the drive current by supplying the maximum drive current to the solenoid until after the valve body starts opening, and then decreasing the drive current from the maximum drive current when the second movable core and the first movable core are brought into contact with the fixed iron core.

2. The control device for the fuel injection device according to claim 1, wherein
    the fuel injection device is configured such that a second gap between the second opposing surface of the second movable core and the fixed iron core is smaller than a first gap between the first opposing surface of the first movable core and the fixed iron core in a valve-closed state.

3. The control device for the fuel injection device according to claim 1, wherein
    the fuel injection device is configured such that a gap is formed between the second movable core and the valve body in a valve-closed state, and the second movable core is engaged with the valve body when the second movable core is moved by an amount corresponding to the gap in the case of starting to move from the valve-closed state.

4. The control device for the fuel injection device according to claim 1, wherein
    the fuel injection device is configured such that a second gap between the second opposing surface of the second movable core and the fixed iron core is smaller than a first gap between the first opposing surface of the first movable core and the fixed iron core in a valve-closed state, and is configured such that the second gap is smaller than a gap formed between an upper surface of a recessed portion of the second movable core and the valve body.

5. The control device for the fuel injection device according to claim 4, wherein
the fuel injection device is configured such that the second gap is equal to or less than a half of a gap formed between the upper surface of the recessed portion of the second movable core and the valve body.

6. The control device for the fuel injection device according to claim 1, wherein
the control unit is configured to control the drive current being supplied to the solenoid such that a lift amount at which the valve body moves at a timing when the second movable core and the first movable core are brought into contact with the fixed iron core is larger than a lift amount at which the valve body moves at a timing when only the second movable core is brought into contact with the fixed iron core.

7. The control device for the fuel injection device according to claim 1, wherein
the control unit is configured to control the drive current being supplied to the solenoid such that a lift amount of the valve body continuously increases while the control unit (i) decreases the drive current from the maximum drive current before the valve body starts to open when only the second movable core is brought into contact with the fixed iron core, (ii) decreases the drive current to the first holding current smaller than the maximum drive current before the valve body starts to open, and (iii) decreases the drive current to the second holding current smaller than the first holding current before the valve body reaches the maximum stroke.

* * * * *